(12) United States Patent
Shahine

(10) Patent No.: US 9,292,807 B2
(45) Date of Patent: Mar. 22, 2016

(54) RECOMMENDING ACTIONS BASED ON CONTEXT

(75) Inventor: Omar H. Shahine, Menlo Park, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1030 days.

(21) Appl. No.: 11/746,794

(22) Filed: May 10, 2007

(65) Prior Publication Data

US 2008/0281510 A1  Nov. 13, 2008

(51) Int. Cl.
*G08G 1/123* (2006.01)
*G01C 21/34* (2006.01)
*G06Q 10/06* (2012.01)

(52) U.S. Cl.
CPC ...................... *G06Q 10/06* (2013.01)

(58) Field of Classification Search
USPC ......... 701/209, 200, 201, 207, 208, 211, 400, 701/708, 408, 516, 454, 526, 527, 532, 533, 701/535, 537, 538, 541; 340/457, 426.19, 340/999, 988, 995, 995.1, 995.19, 995.24; 707/9, 600, 805; 705/9; 379/265.06
See application file for complete search history.

(56) References Cited

U.S. PATENT DOCUMENTS

| | | | |
|---|---|---|---|
| 5,968,109 A * | 10/1999 | Israni et al. | 701/208 |
| 6,202,023 B1 * | 3/2001 | Hancock et al. | 701/201 |
| 6,957,393 B2 | 10/2005 | Fano et al. | |
| 7,016,855 B2 | 3/2006 | Eaton et al. | |
| 7,020,494 B2 | 3/2006 | Spriestersbach et al. | |
| 7,197,500 B1 * | 3/2007 | Israni et al. | 707/809 |
| 7,702,454 B2 * | 4/2010 | Nesbitt | 701/201 |
| 7,945,470 B1 * | 5/2011 | Cohen et al. | 705/7.13 |
| 8,503,664 B1 * | 8/2013 | Kaufman | 379/265.06 |
| 2003/0224762 A1 | 12/2003 | Lau et al. | |
| 2004/0077359 A1 * | 4/2004 | Bernas et al. | 455/456.1 |
| 2004/0176107 A1 | 9/2004 | Chadha | |
| 2004/0203847 A1 | 10/2004 | Knauerhase et al. | |
| 2005/0187707 A1 * | 8/2005 | Yokota et al. | 701/209 |
| 2006/0052090 A1 * | 3/2006 | Behr et al. | 455/414.2 |

(Continued)

OTHER PUBLICATIONS

Kjeldskov et al., "Just-for-Us: A Context-Aware Mobile Information System Facilitating Sociality", Sep. 19-22, 2005, Salzburg, Austria, pp. 23-30, ACM.

(Continued)

*Primary Examiner* — Ronnie Mancho
(74) *Attorney, Agent, or Firm* — Julie Kane Akhter; Danielle Johnston-Holmes; Micky Minhas

(57) ABSTRACT

A system creates filters and provides tasks based on a geographic location associated with each task. The geographic location may be in one of several types of coordinate formats, and determined by the actual user location when the task is created of input associated with a desired location. When a user requests tasks for a specified geographic location, the user's tasks are filtered by a particular geographic location associated with the request. The filter may allow tasks that match the location and are within a threshold distance of the location. Tasks having a geographical location that are outside the threshold distance from the location are not provided. When managing tasks from a mobile device, the geographic location can be automatically determined by the mobile device. When managing tasks from a non-mobile device, the geographical location may be received or derived from user input.

16 Claims, 12 Drawing Sheets

(56) References Cited

U.S. PATENT DOCUMENTS

| | | |
|---|---|---|
| 2006/0058948 A1 | 3/2006 | Blass et al. |
| 2006/0156252 A1 | 7/2006 | Sheshagiri et al. |
| 2006/0182055 A1* | 8/2006 | Coffee et al. ............... 370/328 |
| 2006/0225076 A1 | 10/2006 | Longobardi |
| 2007/0015519 A1 | 1/2007 | Casey |
| 2007/0022380 A1 | 1/2007 | Swartz et al. |
| 2007/0037605 A1* | 2/2007 | Logan ........................ 455/567 |
| 2007/0106468 A1* | 5/2007 | Eichenbaum et al. ....... 701/211 |
| 2008/0234928 A1* | 9/2008 | Matsuoka ................... 701/204 |

OTHER PUBLICATIONS

Luther et al., "Classification-based Situational Reasoning for Task-oriented Mobile Service Recommendation", pp. 1-5, http://sunsite.online.globule.org/Publications/CEUR-WS/Vol-210/paper4.pdf.

Beale et al., "Mobile Context Aware Systems: The Intelligence to Support Tasks and Effectively Utilise Resources", Mobile Human-Computer Interaction, 2004, pp. 240-251, vol. 3160/2004, Springer Berlin/Heidelberg.

* cited by examiner

All user tasks

| Task | Category | Geographic Location |
|---|---|---|
| buy tools | home | Hardware Store (any) |
| get groceries | | Grocery Store |
| buy chair | work | Office |
| Call Dr. | personal | Any |
| return saw | home | Hardware Store 1 |
| return books | | 122° 8.7, 37° 25.0 |

Figure 2A

Tasks for Hardware Store 1 location

| Task | Category | Geographic Location |
|---|---|---|
| buy tools | home | Hardware Store (any) |
| Call Dr. | personal | Any |
| return saw | home | Hardware Store 1 |

Figure 2B

Tasks for Grocery Store location

| Task | Category | Geographic Location |
|---|---|---|
| get groceries | | Grocery Store |
| Call Dr. | personal | Any |
| return book | | 122° 8.7, 37° 25.0 |

Figure 2C

RECOMMENDING ACTIONS BASED ON CONTEXT

BACKGROUND

Personal information management (PIM) systems organize user data in an efficient manner. The user data may include tasks, which describe errands, to do items, and other data for a user. PIMs and other task management applications may organize tasks into categories, but do not provide a context for tasks. Task categories are typically expressed as a string of text, such as subject, group name, or some other category. PIMs do not differentiate any relevance of one category to another; categories typically do not have metadata associated with them. Thus, for example, though a category may include text that describes a location, a typical PIM application does not have any intelligence or context regarding the difference or relationship between one location and another.

When performing tasks, a user may plan what task to do, where to perform the task and when to do it. As a result, it is common for users to group and view tasks into different categories to determine which task(s) to perform. Providing more information regarding when and where to perform a task would be useful in efficiently managing tasks.

SUMMARY

The present technology creates, filters, provides and otherwise manages tasks based on a geographic location associated with each task. The geographic location may be in one of several types coordinate formats and determined by the actual user location when the task is created or input associated with a desired location. When a user requests tasks for a specific geographical location, the user's tasks are filtered by the particular geographical location. The filter may allow tasks that match and are within a threshold distance of the specified geographical location. Tasks having a geographical location that are outside the threshold distance from the location are not provided.

In some embodiments, the present technology may be implemented using a mobile device, such as a cellular phone. Tasks may be created through the mobile device when the device is positioned at the desired geographical location or from user input. Similarly, when a user is at a particular geographical location and requests tasks associated with the location, a task management application on the mobile device may provide tasks are within a specified distance of the current geographical location of the mobile device.

In some embodiments, the present technology may be implemented using a computing device which is not mobile, such a desktop computer or workstation. A user may create and access tasks associated with geographic information using a task management application on the computing device. Though the application may not be located at a desired geographical location for a task, the application receives location information, converts the received location information into a geographic location if needed, and stores tasks with the geographic location data. When a user requests a set of tasks in the future, the user may indicate a planned geographic location or a route over which he intends to travel. The task management application of the computing device may then retrieve tasks associated with the user's planned geographic location or route. Tasks not within a threshold distance of the user's planned geographic location or route are not provided.

One embodiment includes a method for accessing tasks that begins with receiving a task request from the user. The geographic location for the user is determined and one or more tasks are retrieved. The tasks may include one or more first tasks associated with the geographic location of the user. The retrieved tasks are then provided to the user.

An embodiment includes a method which first receives task data associated with a task from a user. A set of geographic location coordinates associated with the task are then determined and associated with the task data. The task data and associated geographic location is then stored as a task.

An embodiment includes a mobile computing device which includes a transceiver, an input device, a memory device, a task management application and a device display system in communication with a processor. The system also includes a geographic locator module driven by the processor which determines the current geographic location of the mobile device. The transceiver transmits and receives data and the memory device stores data. The task management application transmits a request for user generated tasks to a network-based service based on the current geographical location of the mobile device as determined by the geographical locator module. The device display system may display data, including user task data.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 2A is an example of a group of user tasks.

FIG. 2B is an example of a group of user tasks filtered by a first geographic location.

FIG. 2C is another example of a group of user tasks filtered by a second geographic location.

DETAILED DESCRIPTION

Tasks are created, filtered, provided and otherwise managed based on a geographic location associated with each task. The geographic location may be in one of several types of real positioning formats, such as Global Positioning System (GPS), longitude and latitude, or some other format. A geographic location may be associated with a new or existing task and determined by the location of the device creating the task or geographic information received from a user. The tasks may then be filtered by geographical location. The filter may result in tasks that match and are within a threshold distance of a selected geographical location. Tasks having a geographical location that do not match the selected geographical location or are within a threshold distance of the location are not provided.

In some embodiments, the present technology may be implemented using a mobile device, such as a cellular phone. Tasks may be created through the mobile device when the device is positioned at the desired geographical location. Data for the geographical location may be determined by the device or from user input. Similarly, when a user is at a particular geographical location and requests tasks associated with the location, a task management application on the mobile device may provide tasks that match and optionally are within a specified distance of the current geographical location.

In some embodiments, the present technology may be implemented using a computing device which is not mobile, such a desktop computer or workstation. A user may enter geographic information or other location information for one or more tasks into a task management application on the computing device. The task management application receives the information, converts the received location information into a geographic location if needed, and stores the task with the geographic location data. When a user requests a set of tasks in the future, the user may indicate a planned geographic location or a route over which he intends to travel. The task management application of the computing device may then provide tasks associated with the user's planned geographic location or route. Tasks not associated with the user's planned geographic location or route are not provided.

In some embodiments, when a user may save a task as a private task or a public task. Private tasks are only available to the user generating the task. A public task may be accessed by one or more other users having an account with a task management service, such as a web-based PIM service. Similarly, a user may requests private and/or public tasks associated with a geographic location. Managing public and private tasks is discussed in more detail below.

Figure 1:
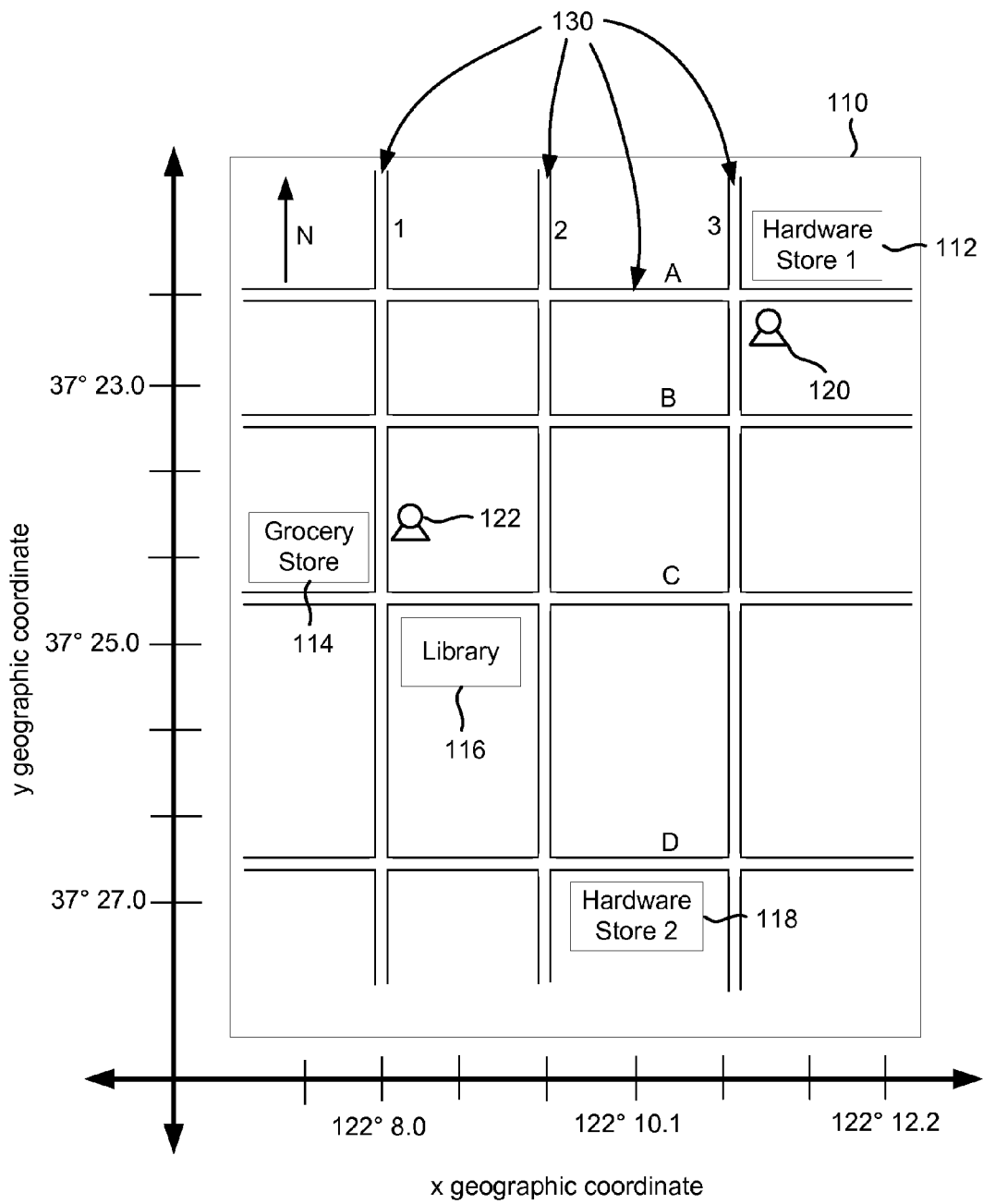
FIG. 1 is an example of a map of geographic locations.

FIG. 1 is an example of a map 110 of geographic locations. FIG. 1 includes an image of a map and a coordinate system. The map includes a first hardware store 112, grocery store 114, library 116, a second hardware store 118, user locations 120 and 122, and several streets 130. Each of stores 112, 114 and 118 and library 116 represent potential destinations subject to a task and have a different geographic locations. Streets 130 running North-South are labeled 1, 2 and 3 and streets running East-West are labeled A, B, C and D.

Grocery store 114 and library 116 are located diagonally across from each other at the intersection of street 1 and C. User 122 is located on street 1 across from grocery store 114. Though user 122 is not located directly next to library 116, tasks associated with library 116 may be provided to a user if library 116 is within a threshold distance of the geographic location of user 122.

In some embodiments, a task may be associated with two or more geographic locations. For example, a task of "buy saw" may be associated with the geographic location for each of hardware stores 112 and 118. The task may then be provided to a user when the mobile device is located at a geographic location (or a user indicates a planned location through a non-mobile computing device) associated with or within a threshold distance of either hardware store one 112 or 118.

In some embodiments, when a user indicates a planned location or route, a list of tasks corresponding to the user's planned location or route may be provided within a map. The map may indicate a route which encompasses the tasks and an indicator for each task along the route, such as a task number, symbol, or some other indicator. The map may be provided through a non-mobile device or a mobile device. When provided through a non-mobile device, the map may be printed onto paper by the user and used for reference while performing the tasks at a later time.

The example of FIG. 1 also includes a geographic coordinate system having an X axis and Y axis. The X axis indicates an east-west geographic coordinate, for example a longitude or first GPS coordinate. Three values displayed along the X axis are 122° 8.0, 122° 10.1 and 122° 12.2. The Y axis indicates a north-south geographic coordinate, for example a latitude or second GPS coordinate. Three values displayed along the Y axis are 37° 27.0, 37° 25.0 and 37° 23.0. In some embodiments, other coordinate or location format may be used to specify a geographic location for a task.

FIG. 2A is an example of a set of user tasks. FIG. 2A includes a check box column, a task description column, a category column and a geographic location column. A task comprises the set of data which make-up the task, such task completion, description, category, comments, geographic location, and other data. In FIG. 2A, the check box column includes a number of boxes in which a user may select to indicate whether or not the task has been completed. The task description column includes short descriptions for each task. The first two task descriptions are "buy tools" and "get groceries." The category column indicates a particular category that a user may associate each task with. The first task is associated with a category of "home."

The geographic location category indicates the geographic location associated with each task. The geographic location may be expressed as a set of coordinates or a label associated with the coordinates. In some embodiments, a task with geographic location includes a set of coordinates and optionally may include a location label. For example, the "return books" task has its geographic location expressed as a coordinate and the "buy tools" task has a geographic location expressed as a the label of "hardware store." The geographic location data for the "buy tools" task includes coordinate data, but the label may be displayed in a user interface because it is easier to associate with a particular location.

The label "hardware store (any)" indicates that the task "buy tools" may be associated with any geographic location associated with a hardware store, such as the geographic location of hardware store 112 and 118. The task "call doctor" has a geographic location of "any," indicating that this task may be performed at any geographic location.

FIG. 2B is an example of a group of user tasks filtered by a first geographic location. The tasks are filtered by the geographic location of hardware store 1, illustrated as hardware store 112 in the map of FIG. 1. The task descriptions listed in FIG. 2B include tasks of buy tools, call doctor and return saw. This filter results in the "buy tools" task with a geographic location of "hardware store (any)," the "call doctor" task with a geographic location of "any," and the "return saw" task with a geographic location of "hardware store 1." These tasks maybe provided in a display of mobile device 210 or computing device 220.

FIG. 2C is another example of a group of tasks filtered by a geographic location. The geographic location used to filter the tasks of FIG. 2A in this embodiment is the location associated with grocery store 114 of FIG. 1. The tasks provided after the filtering are "get groceries", "call doctor", and "return book." The task "get groceries" has a geographic location of "grocery store" and matches the location filter. As mentioned above, the "call doctor" task has a geographic location of "any" and therefore may be provided for any filter. The task of "return book" has a geographic location of "library," which is nearby grocery store 114. In this embodiment, the geographic location of library 114 is determined to be within a threshold distance of the geographic location of grocery store 114. The threshold distance may be a parameter of the user's web-based task management account or indicated in a request for tasks for the user's current (or planned) location. As a result, a user located at the geographic location associated with grocery store 114 can be presented with tasks associated with library 116, which is nearby grocery store 114.

Figure 2D:
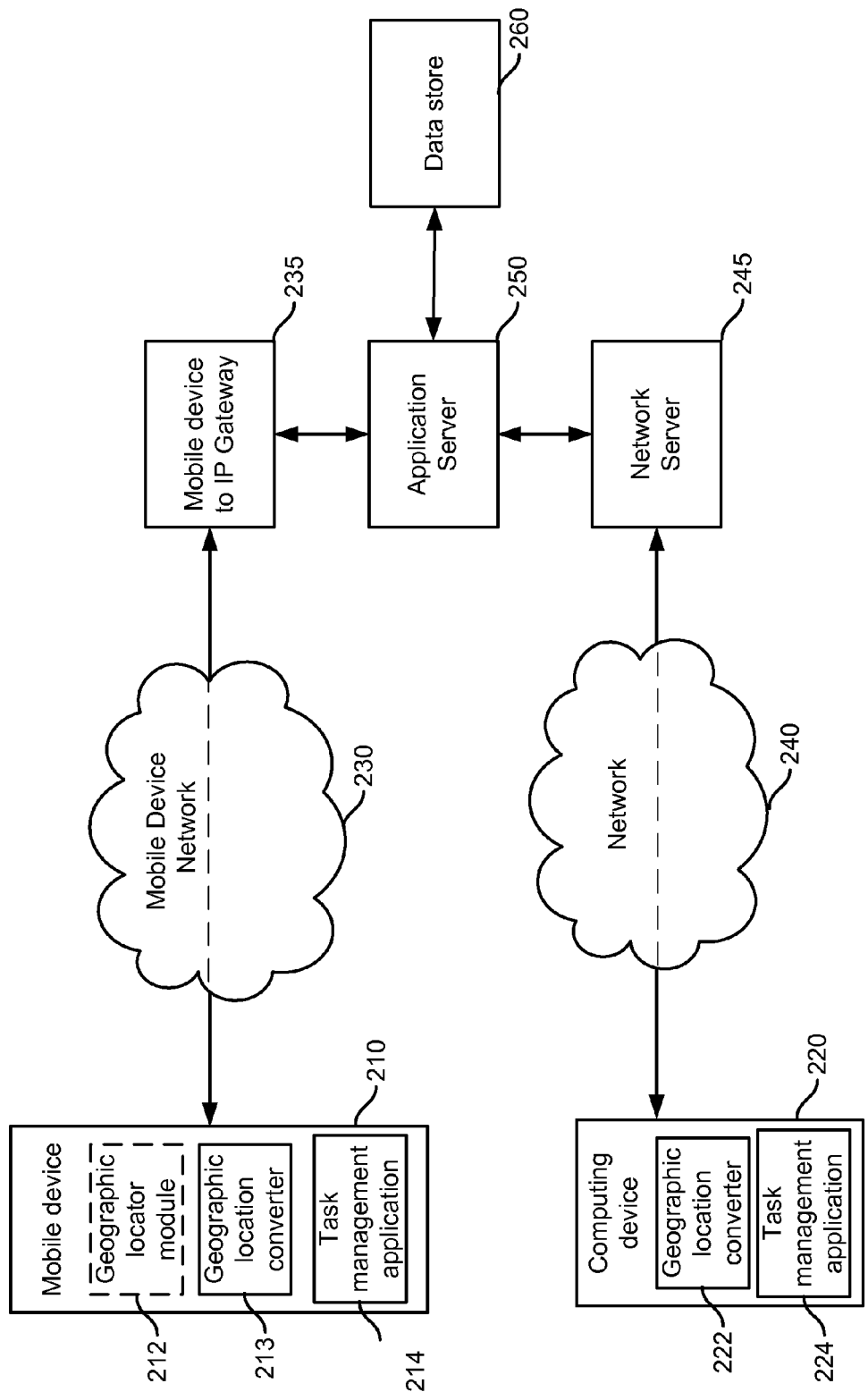
FIG. 2D is a block diagram of a system for managing tasks by context.

FIG. 2D is a block diagram of an embodiment of a system for managing tasks by geographic context. The system of FIG. 2 includes mobile device 210, computing device 220, mobile device network 230, network 240, Mobile device to IP gateway 235, network server 245, application server 250 and data store 260.

Mobile device 210 may communicate with Mobile device to IP gateway 235 over mobile device network 230. Mobile device 210 includes geographic locator module 212, geographic location converter 214, and task management application 210. Geographic locator module 212 can determine the current geographic location in mobile device 210. In some embodiments, module 214 may determine the current geographic location of the mobile device by identifying GPS coordinates provided to the mobile device from one or more mobile device cell stations, in some embodiments, module 212 may be able to determine a geographic location by processing GPS positioning signals received by mobile device 210. In some embodiments, geographic locator module 212 may determine GPS, longitude and latitude coordinates, or some other format of positional data in some other mariner. Geographic location converter 213 may convert geographic information, such as address information, into geographic location data in GPS, longitude and latitude, or some other format. To perform the conversion, converter 213 may perform the conversion within mobile device 213 or invoke geographic position conversion application on application server 250.

Task management application 214 on mobile device 210 can enable a user to create, modify and delete tasks, as well as login into a web-based task management service. For example, task management application may allow a user to login to a user account ultimately provided through application server 250, provide a list of tasks as illustrated in FIG. 2A, submit a query for tasks associated with a particular geographic location, and provide a resulting list of tasks associated with the geographic location such as the task lists of FIGS. 2B-2C.

Mobile device network 230 is a network for exchanging data and otherwise communicating between mobile device 210 and Mobile device to IP gateway 235. In some embodiments, mobile device network 230 may be provided by a mobile device communication provider, such as Cingular Wireless of Atlanta Ga., or AT&T, Inc., of San Antonio, Tex.

Mobile device to IP Gateway 235 may receive data over mobile device network 112 in a mobile device protocol such as WAP, convert the received data to a network compatible protocol, such as HTML or XML, and forward the converted data to application server 250. Similarly, Gateway 235 may receive data from application server 250, convert the data from a network protocol to a mobile protocol, and forward the converted data to mobile device 210.

Computing device 220 may include any computer which is generally not considered mobile, such as a desktop computer or workstation. Computing device 220 includes geographic location converter 222 and task management application 224. Geographic location converter 222 may convert geographic information, such as an address, to a geographic location in GPS, longitude and latitude or some other coordinate system. Computing device 220 communicates with network server 245 over network 240.

Task management application 224 is similar to task management application 214 in mobile device 210 in that it may enable a user to create, modify and delete tasks, as well as login into a web-based task management service. However, when communicating with application server 250, task management application 224 accesses server 250 over network 240 through network server 245.

Network server 245 may receive requests over network 240 and provide responses to requests. Network server 245 may provide a web-based task management service, calendar service, PIM service, or other service that allows a user to create and manage tasks. In some embodiments, network server 245 may be implemented as a web server. In processing requests, network server 245 may invoke application server 250. Network 240 may be implemented as the Internet or other WAN, a LAN, intranet, extranet, private network or other network or networks.

Application server 250 may perform business logic for managing user accounts for a web based task management, calendar, PIM or other service as well as performing other business logic. Application server 250 may provide for user logon, access to contact information, access to user tasks associated with a user account and other functionality.

Data store 260 may store task data, user account information such as username and password data, and other information. Data store 260 may be accessed by application server 250. In some embodiments, data store 260 may include business logic which may identify the relative distance between one or more tasks. For example, if data store 260 receives a request for all tasks for a user which are within one mile of a particular location described in GPS coordinates, data store 260 may determine whether each of the user's private and public tasks are within one mile of the specified location.

Figure 3A:
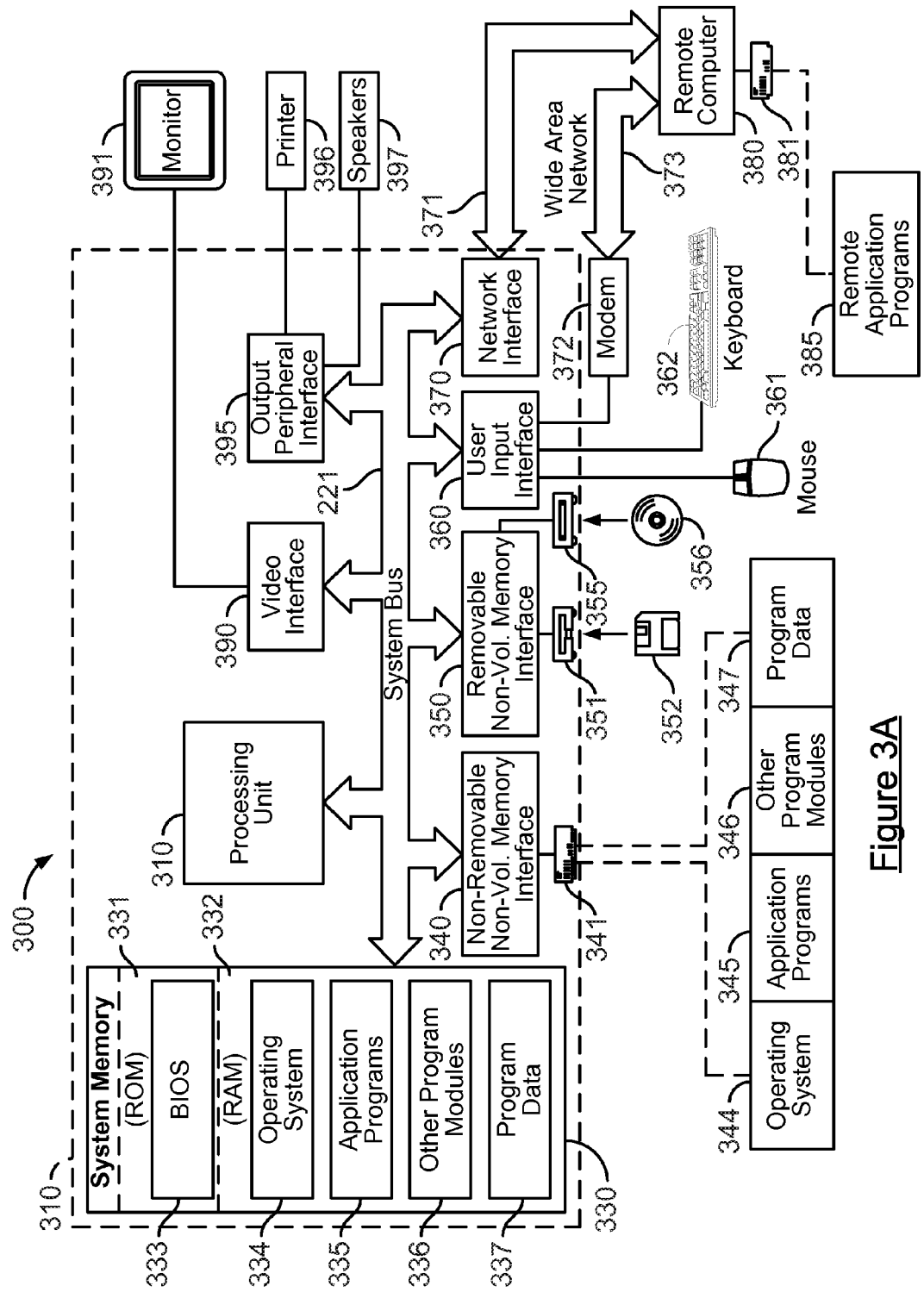
FIG. 3A is a block diagram of an embodiment of a computing environment for implementing the present technology.

FIG. 3A is a block diagram of an embodiment of a computing environment for implementing the present technology. In some embodiments, the computing environment 300 of FIG. 3A provides more detail for computing device 220, Mobile device to IP gateway 235, network server 245, application server 250 and data store 260.

Computing environment 300 of FIG. 3 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the technology herein includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media or processor readable storage devices (collectively referred to as either computer readable media or processor readable storage devices). Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 30 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Figure 3B:
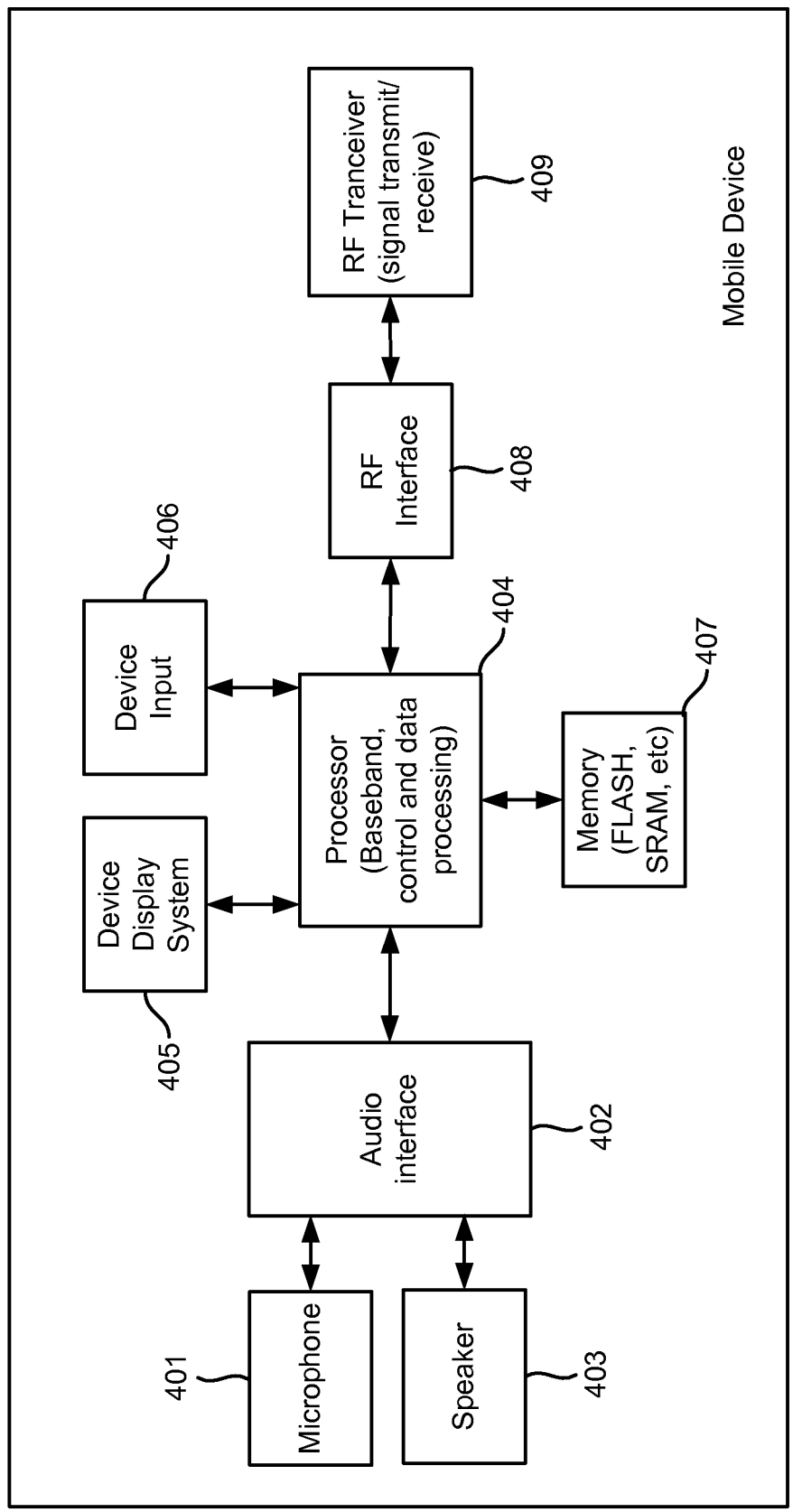
FIG. 3B is a block diagram of an embodiment of a mobile device for implementing the present technology.

FIG. 3B is a block diagram of an embodiment of a mobile device for implementing the present technology. In some embodiments, the mobile device of FIG. 3B provides more detail for mobile device 210. The mobile device of FIG. 3B includes microphone 401, speaker 403, audio interface 402, processor 404, device display system 405, device input 406, memory 407, RF interface 408 and RF transceiver 409. In some embodiments, the mobile device of FIG. 3 may be implemented as a cell phone, personal digital assistant, a smart phone, or some other mobile device.

Audio interface 402 sends audio signals to speaker 403 and receives an audio signal from microphone 401. The audio signals sent to speaker 403 are provided to interface 402 by processor 404. The audio signals received through microphone 401 are transmitted by interface 402 to processor 404. In some embodiments, audio interface may perform additional processing to signals sent to and received from processor 404, such as amplifying, filtering, and other processing.

Processor 404 communicates with audio interface 402, device display system 405, device input 406, memory 407 and RF interface 408. Processor 404 may perform baseband, control and data processing for the mobile device. Baseband processing can be performed on audio signals received from and sent to audio interface 402. Control and data processing can be performed when receiving input data from device input 406, providing display data to be displayed on device display system 405 and creating, reading, updating and deleting data from memory 407. Additionally, processor may send and receive signals from RF interface 408.

Device display system 405 may display data, images, video, and other information for the mobile device. The display system may include a display, such as an LCD display, as well as additional circuitry and components to drive the display. The device input keyboard may be a numerical keypad, alphanumeric keyboard keypad, a touch screen device, or some other input device.

Memory 407 may be implemented as FLASH, SRAM, DRAM, or some other type of memory. As discussed above, processor 404 may access memory 407.

RF transceiver 409 may transmit and receive RF signals. The RF signal may be a cellular phone signal, a Wi-Fi signal, or some other type of signal. RF transceiver 409 is driven by processor 404 through RF interface 408. RF interface 408 may process signals sent between RF transceiver 409 and processor 404. Processing performed by RF interface 409 may include signal amplification, filtering, analog to digital conversion, demodulation, and other processing. In some embodiments, signal processing may also be performed by processor 404.

Figure 4:
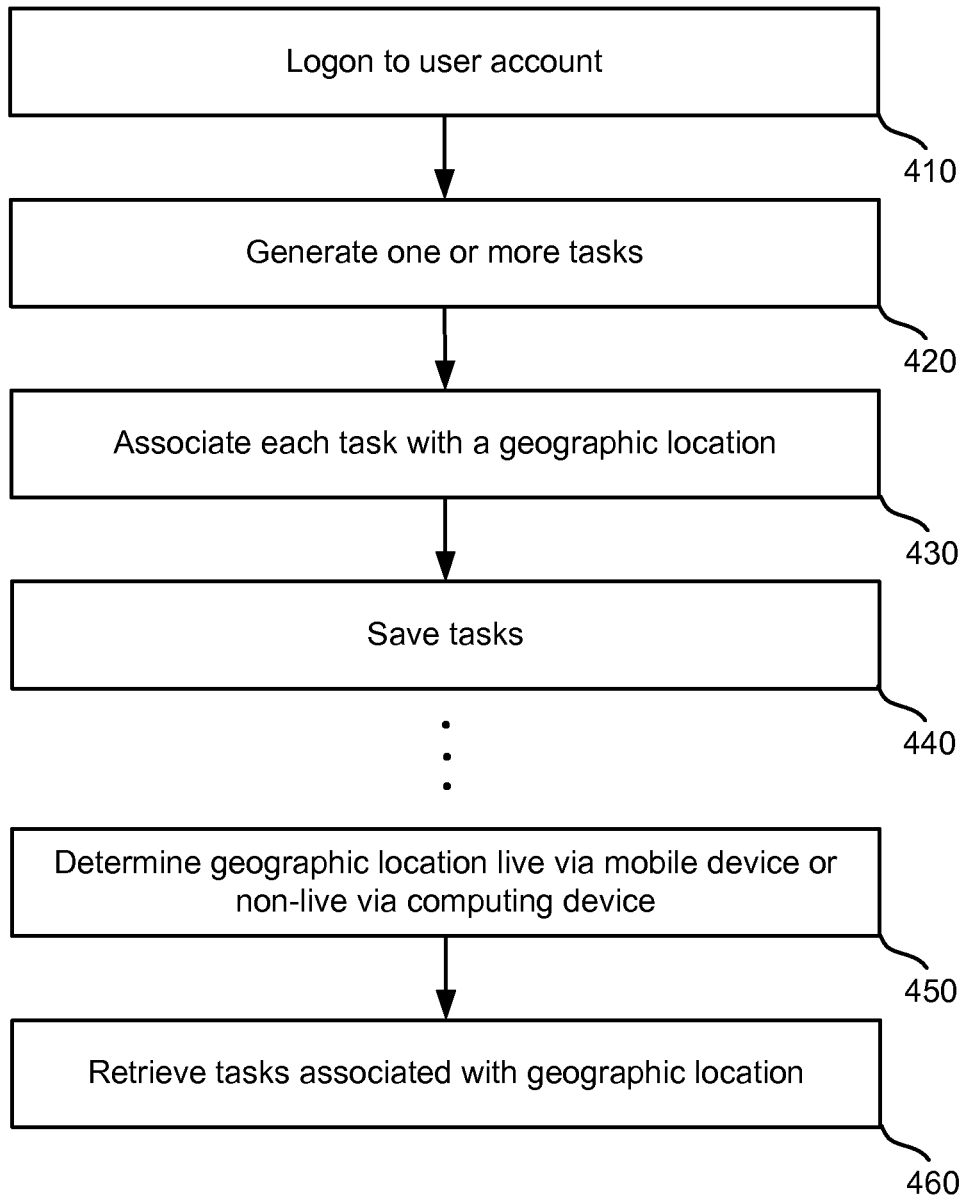
FIG. 4 is a flowchart of an embodiment of a method for managing tasks by geographic location.

FIG. 4 is a flowchart of an embodiment of a method for managing tasks by geographic location. The method in FIG. 4 is a high level method which presents an overview of the operation of the present technology. First, a user may logon to a user account at step 450. User login may include providing a username and password to a task management application. The application may then perform a login procedure with application server 250.

After a user is logged in, one or more tasks are generated by a user at step 420. The tasks may be generated from mobile device 210, computing device 220 or some other device. Each task generated is associated with a geographic location at step 430. Associating a task with a geographic location includes determining the geographic location and adding the location data to the task data. The geographic location may be determined by a geographic locator module, from location information received as user input, or in some other manner. The generated tasks are saved at step 440. Saving the task may include storing the task to data store 260. In some embodiments, the tasks are stored with a user's account with a web-based task management service. In some embodiments, the tasks may be stored locally to either mobile device 210 or computing device 220.

At some time after one or more tasks have been generated and saved, a user may access one or more tasks associated with a geographic location. To access one or more tasks for a geographic location, the geographic location of the user is determined at step 450. The geographic location may be determined live using mobile device 210 or non-live using computing device 220 or mobile device 210. Determining the geographic location in a live manner involves determining the current location of mobile device 210 when the user requests one or more tasks. Determining the geographic location in a non-live manner through computing device 220 (or mobile device 210) involves determining the geographic location based on input provided to the particular device by the user. After determining the geographic location, tasks associated with the location are retrieved at step 460. The retrieved tasks are those which pass a filter based on the geographic location. The filter may pass tasks that match or are within a threshold distance of a specified geographic location. Details of the method of FIG. 4 are discussed in more detail below with respect to methods of FIGS. 5 through 10.

Figure 5:
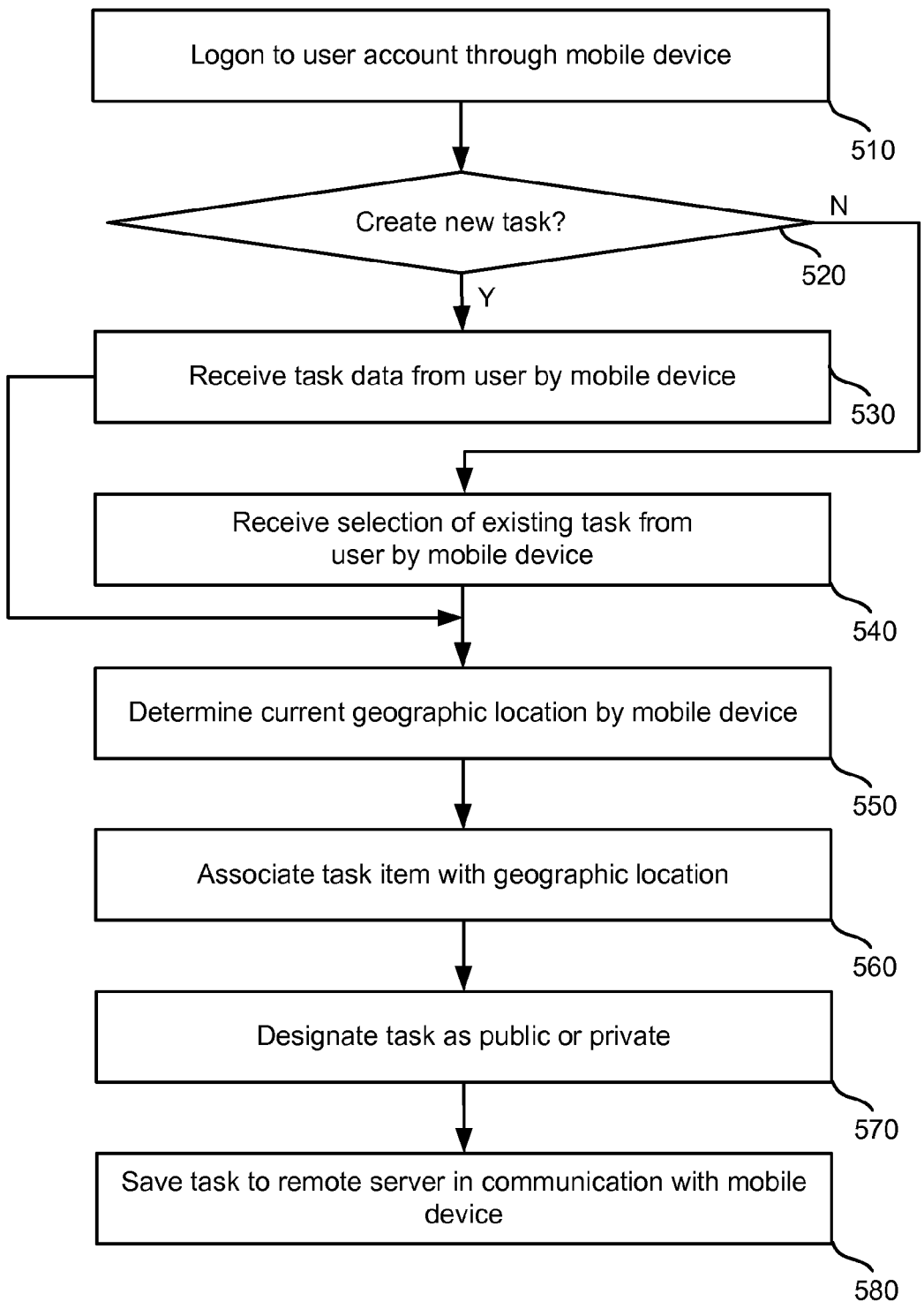
FIG. 5 is a flowchart of an embodiment of a method for saving tasks with geographic location data using a mobile device.
Figure 6:
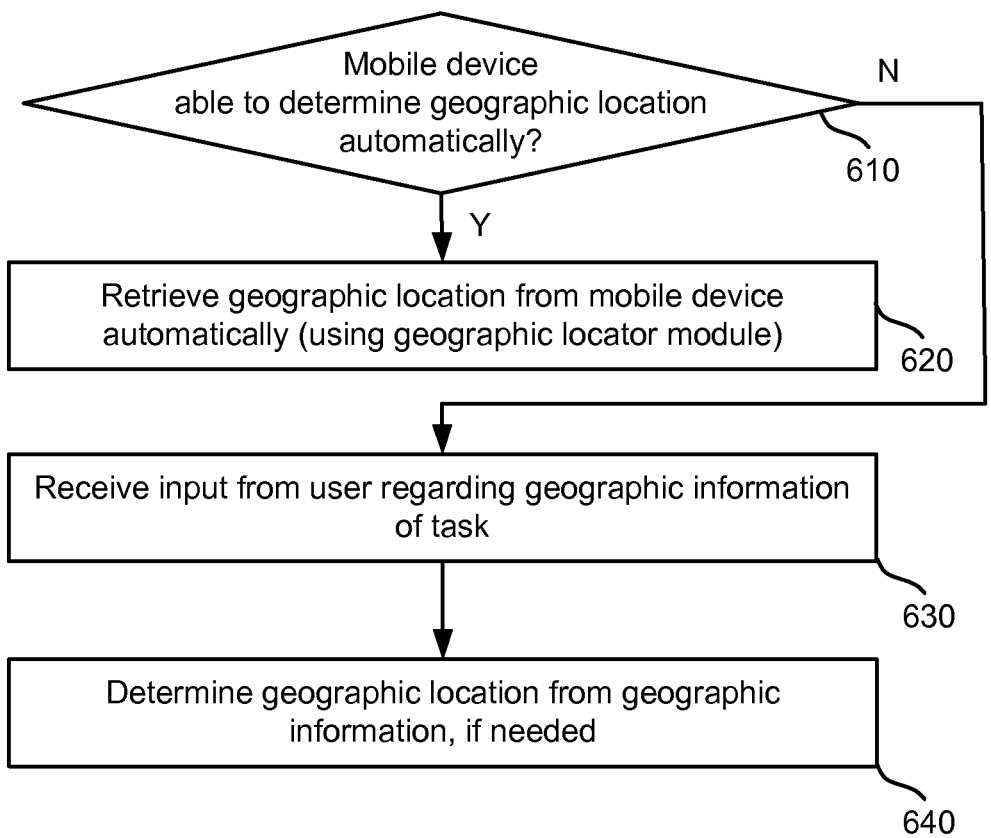
FIG. 6 is a flowchart of an embodiment of a method for determining a current geographic location for a mobile device.
Figure 7:
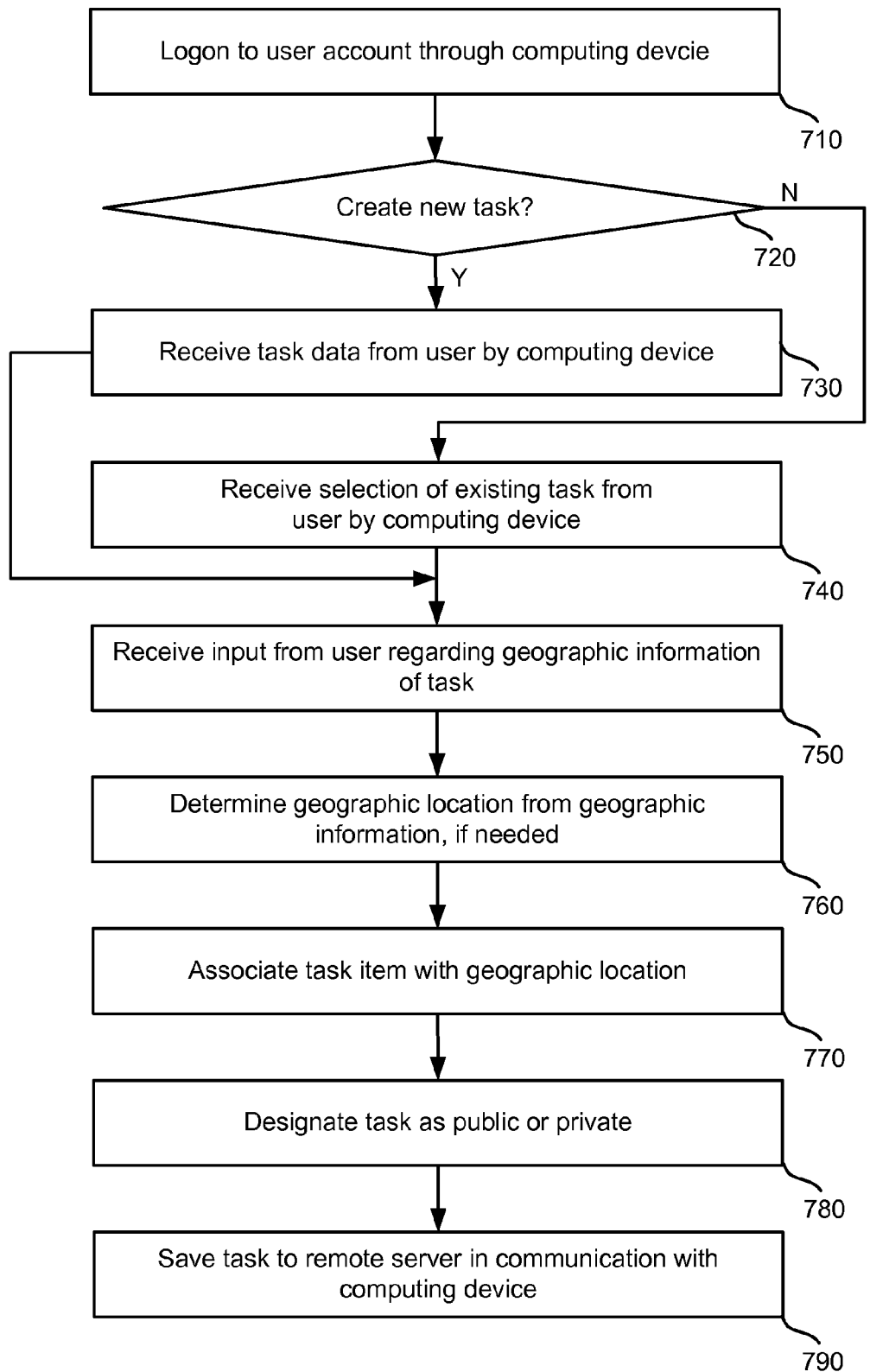
FIG. 7 is a flowchart of an embodiment of a method for saving tasks with geographic location data using a computing device.
Figure 8:
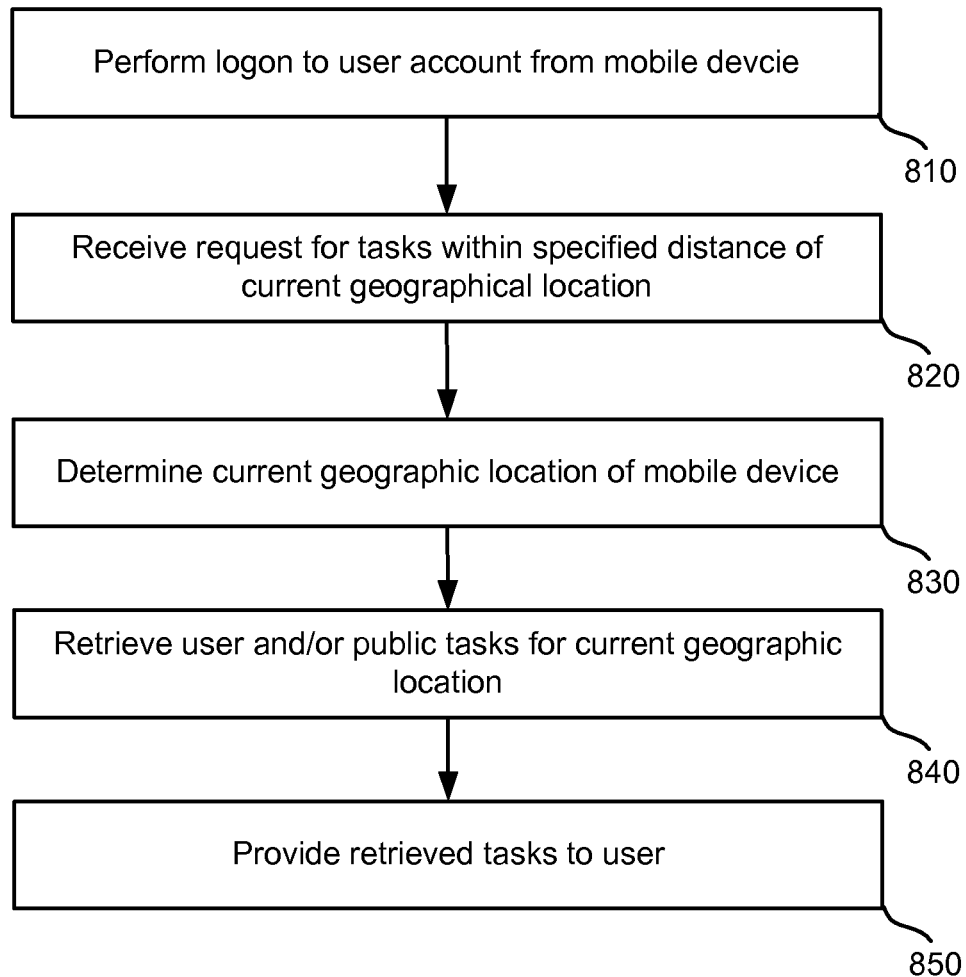
FIG. 8 is a flowchart of an embodiment of a method for providing tasks associated with a geographic location to a user by a mobile device.
Figure 9:
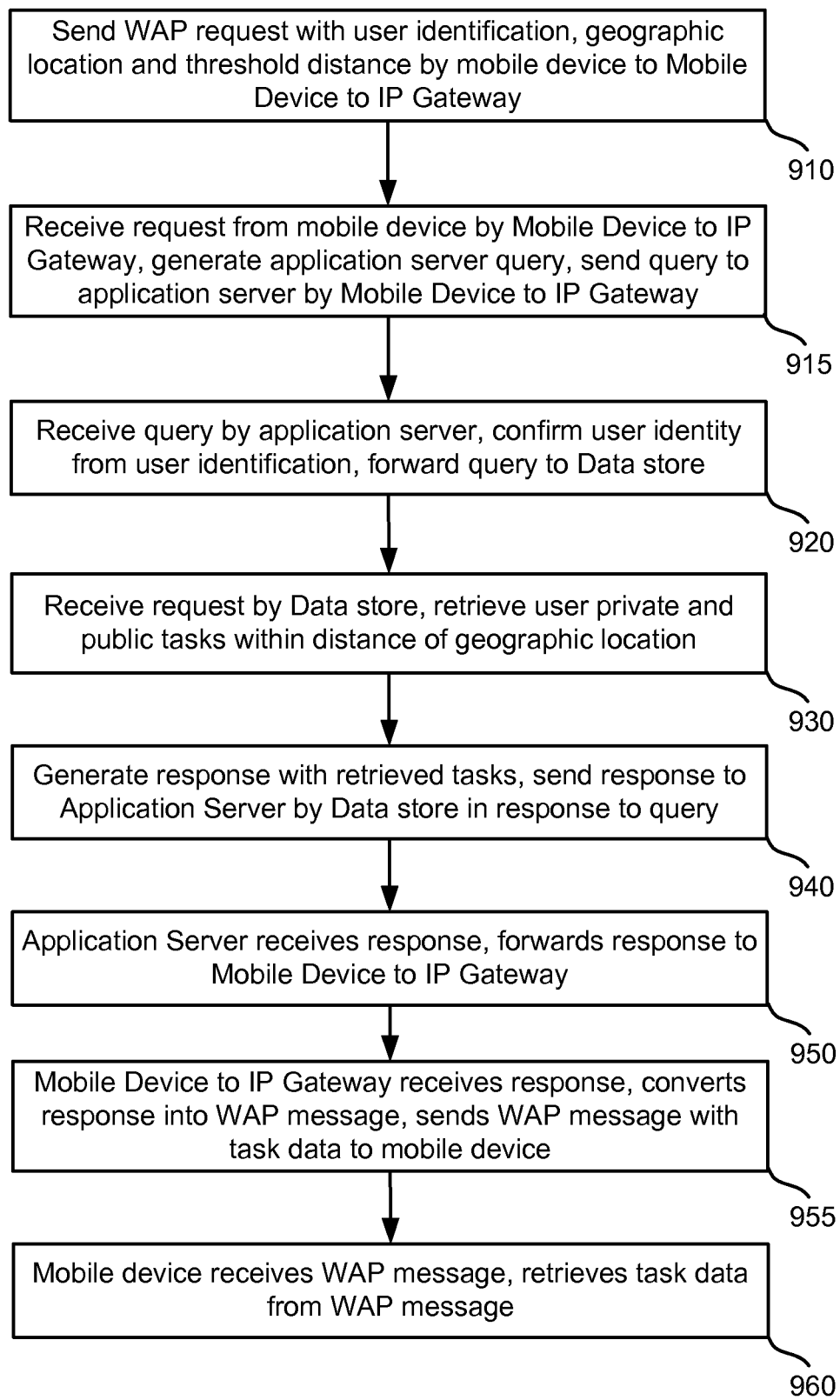
FIG. 9 is a flowchart of an embodiment of a method for retrieving tasks associated with a geographic location.
Figure 10:
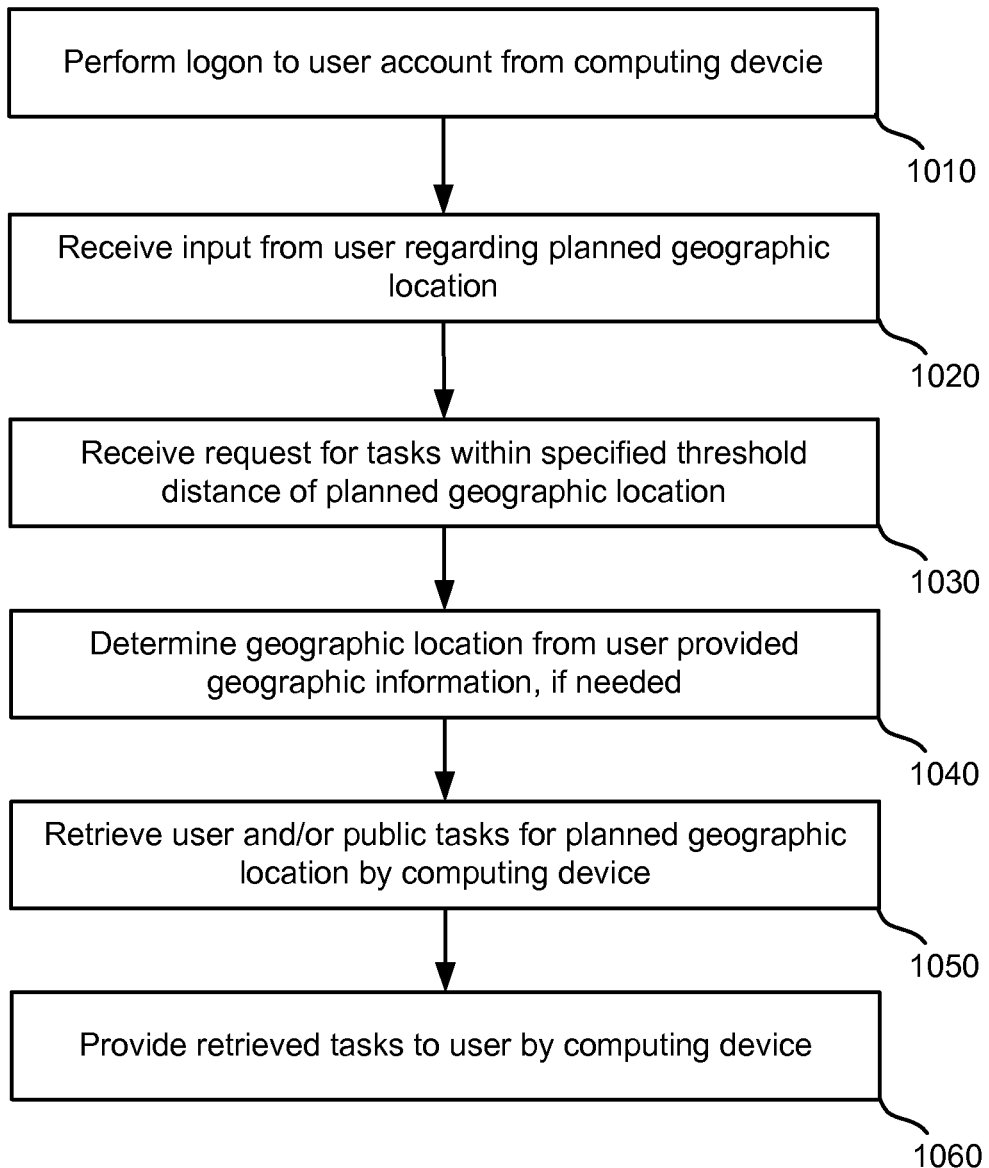
FIG. 10 is a flowchart of an embodiment of a method for providing tasks associated with a geographic location to a user by a computing device.

FIGS. 5-10 provide embodiments of methods for generating and managing tasks with respect to one or more geographic locations. In particular, FIGS. 5-7 illustrate methods for generating tasks associated with geographic locations. FIGS. 8-10 illustrate methods for accessing existing tasks based on a geographic location.

FIG. 5 is a flowchart of an embodiment of a method for saving tasks with geographic location data using a mobile device. In one embodiment, FIG. 5 provides more detail for steps 410-440 of method of FIG. 4 for use with a mobile device.

User account login is performed through mobile device 210 at step 510. Account login may include receiving a username and password by mobile device 210 and sending the username and password to application server 250 through mobile device to IP gateway 235. Application server 250 confirms the username and password match an existing account stored with data store 260. If the user information matches an account, application server 250 sends a login successful message to mobile device 210 through mobile device to IP gateway 235.

Next, a determination is made as to whether a new task should be created at step 520. If the user wishes to add geographic location to a new task, the new task should be created. In some embodiments, a task may be associated with one or more locations, such as two different hardware store locations. Thus, at some point, a user may wish to add a geographic location to an existing task. If the geographic location is to be added to an existing task, then a new task should not be created at step 520. If a new task is to be created, task data is received from a user by mobile device 210 at step 530. The task data may include a task completion, description, category, due date, and other data. After receiving the task data, the flowchart of FIG. 5 continues to step 550. If at step 520 a new task is not to be created, a selection of an existing task is received from the user by mobile device 210 at step 540. After receiving a selection of the existing task, the method of FIG. 5 continues to step 550.

The current geographic location is determined by a mobile device at step 550. The current geographic location may be determined by a geographic locator module 212 automatically or geographic location converter based on user input. Determining the current geographic location of mobile device 210 is discussed in more detail below with respect to FIG. 6.

The task is associated with the geographic location at step 560. In some embodiments, associating a task item with a geographic location involves adding the geographical location to the task data for the task. The task is then designated as a public task or a private task at step 570. The user may indicate if a task is private, public or otherwise shared through task management application 214 of mobile device 210. In some embodiments, a user may select one or more contacts associated with the user's web-based account to share the particular task with.

The task may be saved to a remote server in communication with mobile device 210 at step 580. Saving the task to a remote server may include sending a save query to application server 250 through mobile device to IP gateway 235 by mobile device 210. The query may include user identification information, task data including the geographic location information, and/or other data. After receiving a query and confirming the identity of the user, application server 250 may store the task with the user's account in data store 260. Data store 260 stores the task, and sends a confirmation message to application server 250. Application server 250 receives the confirmation from data store 260 and sends a confirmation response to mobile device 210 through mobile device to IP gateway 235.

FIG. 6 is a flowchart of an embodiment of a method for determining a current geographic location for mobile device 210. In some embodiments, the method of FIG. 6 provides more detail for step 550 of the method of FIG. 5. First, a determination is made as to whether mobile device 210 can determine the geographic location of the device automatically at step 610. In one embodiment, mobile device 210 may determine its geographic location automatically if it is enabled with geographic locator module 212. The module may be comprised of code or some other module for identifying the current geographic location for the mobile device from signals received from GPS satellite hardware, mobile device network cell stations, or other hardware. The current geographic location may be determined in terms of GPS data, longitude and latitude data or in some other location format. If mobile device 210 can determine its geographical location automatically, the geographic location is automatically determined at step 620. The location of the mobile device may be automatically determined by geographic locator module 212.

In some embodiments, task management application 210 may send a message to module 212 to determine the mobile device users' location, for example in GPS format. Geographic locator module 212 may determine the location and send the location to task management application 214. If mobile device 210 can't automatically determine its location, the method of FIG. 6 continues to step 630.

Input is received from a user regarding geographic information for a task at step 630. The input received from the user may include GPS, longitude and latitude, an address, selection of a point on a map, or some other type of data. A geographic location is determined from the geographic information provided by the user at step 630, if needed, at step 640. If a user provides an address or some other location information, the address or other data is converted into GPS, longitude or latitude or other geographic location data at step 640.

FIG. 7 provides a flowchart of an embodiment of a method for saving tasks with geographic location data using computing device 220. In some embodiments, the method of FIG. 7 provides more detail for steps 410-440 of the method of FIG. 4 with respect to computing device 220 or some other non-mobile device.

First, login is performed to a user account at step 710. The logon may be performed to a web service provided by network server 245 and application server 250. The login process for step 710 is similar to that of FIG. 5 for a mobile device, except that user data is provided to application server 250 through network server 245 from computing device 220 rather than through mobile device to IP gateway 235.

Next, a determination is made as to whether a new task should be created at step 720. Similar to step 520 of FIG. 5, a new task should be created if a user indicates that a geographical location should be associated with a new task rather than an existing task. If a new task should be created, task data for the new task is received from a user by computing device 220 at step 730 and the method of FIG. 7 continues to step 750. The task data may include task completion, description, category, notes, and other task data. If a new task is not to be created, a selection of an existing task is received from a user by computing device 220 at step 740. The process of creating a new task and selecting an existing task may be handled by task management application 224. The method of FIG. 7 then continues to step 750.

Input is received from a user regarding geographic information to associate with a task at step 750. The geographic information will be associated with a task with the intent that the task will be performed at a location other than that of computing device 220. The geographic location information can be received by a user as GPS, longitude and latitude, an address or some other data at step 750. The geographic location is determined from the geographic information provided at step 750 at step 760, if needed. Thus, if the geographic information received at step 750 is an address, GPS or other geographic location information may be determined from this geographic information. The GPS conversation can be performed by submitting a request to application server 250, submitting a request to some other network service, or performing the conversion locally on task management application 220.

A task is associated with the geographic location at step 770. Similar to step 560 of FIG. 5, associating the location with the task can include adding the geographic location data to the task data. After associating the geographic location with a task, a user may designate whether the task is a public or private task at step 780. The task is then saved to data store 260 through application server 250 at step 790. The process for saving a task to application server 260 through computing device 220 begins with sending a query to save the task data to network server 245 over network 240. The query contains user identification information, task data, and other data. Network server 245 receives the query and generates a save task request for application server 250. The request includes user identification information and task data contained in the query received from computing device 220. The request is sent to application server 250, which receives the request and sends a store task request to data store 260. Data store 160 receives the request, stores the task data and sends a confirmation response to application server 250. Application server 250 receives the response and forwards the response to network server 245, which receives and forwards the response to computing device 220.

FIGS. 8-10 illustrate embodiments of methods for providing tasks to a user which are associated with geographical locations by mobile device 110 (FIG. 8) and by computing device 220 (FIG. 10). FIG. 8 is a flowchart of an embodiment of a method for providing tasks associated with a geographic location to a user by mobile device 210. FIG. 8 provides more detail for steps 450-460 of the method of FIG. 4. A user logon process is performed from the mobile device at step 810. Similar to the login device performed at step 510, a user enters a username and password to the mobile device, and the mobile device 810 logs the user into a web-based task managing service.

The mobile device receives a request from the user for one or more tasks at step 820. The request may include a geographic location and a threshold distance. For example, the request may include a distance value of one mile. In some embodiments, the distance threshold is store with the user's web-based account in data store 260 rather than being specified with each user task request. The user's current geographic location is determined at step 830. Determining the geographic location of the mobile device of the user may be determined as discussed above with respect to the method of FIG. 7. Thus, if the mobile device may automatically determine its own location using a geographic locator module 212, it does so. Otherwise, the geographic location of the mobile device is determined from user input.

Private and public tasks associated with the user and within the distance threshold of the current geographical location are retrieved at step 840. In one embodiment, a query is sent to retrieve the data from data store 260 with the information needed to retrieve the tasks. Data store 260 receives a corresponding request, determines which tasks should be retrieved, and sends task data for the retrieved tasks back to mobile device 210. Retrieving user and public tasks for a geographic location is discussed in more detail below with respect to the method of FIG. 9. After retrieving the tasks, the tasks are provided to a user at step 850. The retrieved tasks may be displayed in a screen or other output device associated with mobile device 210. The displayed tasks may be sorted by distance from current location, importance, or in some other manner.

FIG. 9 is a flowchart of an embodiment of a method for retrieving tasks within a distance of a geographic location for mobile device 910. In some embodiments, the method of FIG. 9 provides more detail for step 840 of the method of FIG. 8. First, a wireless application protocol (WAP) request with user, geographic location, and threshold distance data is sent by mobile devise 210 to mobile device to IP gateway 235 over mobile device network 230 at step 910. The request may also indicate whether private and/or public tasks should be retrieved and contain other data. Mobile device to IP gateway 235 receives the request, generates a query for application server 250 in IP format, and sends the query to application server 250 at step 915. Application server 250 receives the query and confirms the user identity using user identification information contained in the query. Upon confirming that the user identity matches a user account, application server 250 queries data store 260 for tasks associated with the indicated geographic information in the original request.

Data store 260 receives the request from application server 250 and retrieves the user private and public tasks associated with the geographic location at step 930. The retrieved tasks are those that have geographical location data that match the location data in the query and are determined to be within a distance equal to or less than the threshold distance from the geographic location. Data store 260 generates a response with the retrieved tasks and sends the response to application server 250 at step 940. Application server 250 receives the response and forwards the response to mobile device to IP gateway 235 at step 950. Mobile device to IP gateway receive the response, converts the response into a WAP message and sends the WAP message with the retrieved task data to mobile device 210. Mobile device 210 receives the response containing the retrieved private and public tasks at step 960.

FIG. 10 is a flowchart of an embodiment of a method for providing tasks associated with a geographic location to a user by a computing device. In some embodiments, the method of FIG. 10 provides more detail for steps 450-460 of the method of FIG. 4. First, a user logs on to a user account through application server 250 from computing device 1010. This may be performed similar to step 810 of the process of FIG. 8, except that the login is performed from computing device 220 through network server 245 rather than mobile device 210.

Input is received from a user regarding a planned geographic location a step 1020. The input may have a format of GPS, longitude/latitude data, an address or some other format. The planned geographic location may be a particular location, such as a grocery store address, or a route over which the user intends to travel. For example, a user may enter a beginning address and an ending address. Next, a request is received for tasks within a specified threshold of the planned geographic location at step 1030. The request may be received as input through an interface provided by task management application 224, and indicate the threshold distance as well as whether private and/or public tasks should be retrieved.

The geographic location is determined from the geographic information received at step 1030, if needed, at step 1040. Thus, the GPS or other geographic location data may be determined from an address or a route provided as input at step 1030. User and/or public tasks are then retrieved for the geographic location at step 1050. A request may include user identification information, geographic location data, a distance threshold and optionally other data. Similar to the process of FIG. 9, a request is sent from computing device 220 to application server 250. However, the request from computing device 220 is sent over network 240 to network server 245, which forwards the request to application server 250. Application server 250 will then forward a response to computing device 220 through network server 245.

The retrieved tasks are provided to a user by computing device 220 at step 1060. The tasks may be those associated with the indicated geographic location as well as those within the threshold distance specified in the task request or stored with the user account. In some embodiments, the tasks may be all tasks within the threshold distance of the planned route provided by a user as indicated at step 1030. The tasks may be provided to the user in the form of a printout, an e-mail, an instant message or in some other format.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

I claim:

1. A computer implemented method for accessing tasks, comprising:
    receiving user input from a user by a mobile device, the user input task data including a description of one or more tasks to be performed by the user and indicating a planned route provided by the user;
    determining a current geographic location of the mobile device and selecting the current geographic location as a first geographic location of the user by at least one of the mobile device and a computer system communicatively coupled to the mobile device;
    filtering the one or more tasks by at least one of the mobile device and the computer system based on the first geographic location of the user and the planned route provided by the user;
    providing to the user first task data that has been designated as a public task and which passes the filtering and includes a description of one or more first tasks to be performed by the user at the first geographic location along the planned route provided by the user, the one or more first tasks being a subset of the one or more tasks to be performed by the user, by displaying the provided first task data in a map on a display of the mobile device; and
    not providing to the user task data designated as private by another user and other task data describing at least one task of the one or more tasks that is outside a threshold distance of the first geographic location.

2. The method of claim 1, wherein said determining the current geographic location of the mobile device includes:
    receiving address information; and
    converting the address information into geographic location coordinates.

3. The method of claim 1, wherein said one or more first tasks include a public task and a private task.

4. The method of claim 1,
    wherein the filtering the one or more tasks by at least one of the mobile device and the computer system based on the first geographic location of the user further comprises:
        using a filter of the threshold distance of the first geographic location;
        determining a second geographic location is within the threshold distance of the first geographic location; and
        responsive to the second geographic location being within the threshold distance of the first geographic location, providing to the user second task data including a description of one or more second tasks to be performed by the user at the second geographic location by displaying the second task data on the display of the mobile device.

5. The method of claim 4, wherein the user input requesting task data including the description of one or more tasks to be performed by the user includes the first geographic location and the threshold distance.

6. The method of claim 1, wherein the first geographic location is a planned geographic location of a user.

7. The method of claim 1, further comprising:
    receiving user input requesting task data including a description of one or more tasks to be performed within the threshold distance of a planned geographic location;
    filtering the one or more tasks by at least one of the mobile device and the computer system based on the planned geographic location and the threshold distance to the planned geographic location;
    providing to the user task data for at least one task of the one or more tasks which passes the filtering based on the planned geographic location and the threshold distance to the planned geographic location by displaying the task data for the at least one task on the display of the mobile device; and
    not providing to the user other task data describing at least one task of the one or more tasks filtering filtered based on the planned geographic location and outside of the threshold distance to the planned geographic location by not displaying the other task data.

8. The method of claim 7, further comprising:
    filtering the one or more tasks by at least one of the mobile device and the computer system based on the planned route provided by the user and the threshold distance of the planned route provided by the user;
    providing to the user task data which passes the filtering based on the planned route provided by the user and the threshold distance of the planned route provided by the user and which task data includes a description of the one or more tasks to be performed within the threshold distance of the planned route provided by the user by displaying the task data including the description of one or more tasks to be performed within the threshold distance of the planned route provided by the user on the display of the mobile device; and
    not providing to the user other task data describing at least one task of the one or more tasks filtered based on the planned route provided by the user and outside of the threshold distance of the planned route provided by the user.

9. One or more processor readable storage devices having processor readable code embodied on said processor readable storage devices, said processor readable code for programming one or more processors to perform a method comprising:
    receiving task data by a mobile device including a description of a task to be performed by a user and indicating a planned route provided by the user;
    associating a geographic location and the planned route provided by the user with the task by at least one of the mobile device and a computer system communicatively coupled to the mobile device by determining the geographic location for the task along the planned route provided by the user and storing the geographic location in the task data for the task;
    storing, by at least one of the mobile device and a computer system, the task data including the associated geographic location along the planned route provided by the user in an accessible memory;
    responsive to at least one of the mobile device and the computer system, determining the geographic location along the planned route provided by the user associated with the task passing a filter based on a current geographic location along the planned route provided by the user of the mobile device associated with the user, providing the task data including the description of the task to be performed by the user and that has been designated as a public task, and displaying the provided task data in a map on a display of the mobile device, wherein the map displayed on the mobile device displays an indicator for each task of the one or more tasks along the planned route provided by the user; and responsive to determining that the geographic location along the planned route provided by the user associated with the task is outside of a threshold distance of the current geographic location along the planned route provided by the user of the mobile device, not providing the task data including the description of the task to be performed by the user and which has been designated as private by another user.

10. The one or more processor readable storage devices of claim 9, wherein the task data, planned route provided by the user and geographical location coordinates are stored with a user account on a remote data store.

11. The one or more processor readable storage devices of claim 9, wherein receiving task data includes receiving a selection of an existing task.

12. The one or more processor readable storage devices of claim 9, wherein further comprising:
automatically determining current geographic location coordinates for the mobile device by the mobile device.

13. The one or more processor readable storage devices of claim 12, wherein said associating the geographic location includes:
adding a second set of geographical location coordinates for the task to be performed by the user.

14. A mobile computing device, comprising:
a processor;
a transceiver configured to transmit and receive data and in communication with the processor;
an input device configured to receive user input and in communication with the processor, the user input indicating at least one route point along a planned route provided by the user;
a memory device configured to store data and in communication with the processor;
a geographic locator module driven by the processor and configured to determine the current geographic location of the at least one route point along the planned route provided by the user of the mobile device and a threshold distance of the current geographic location of the at least one route point along the planned route provided by the user;

a task management application in communication with the geographic locator module and executing on the processor, the task management application retrieves, from a communicatively coupled network-based service, task data including a description of one or more user generated tasks which task data has geographic location data and the at least one route point along the planned route provided by the user data;

the task management application determines whether the geographic location data and the at least one route point along the planned route provided by the user data of the task data pass a filter based on the current geographical location the at least one route point along the planned route provided by the user of the mobile device and the threshold distance of the current geographic location the at least one route point along the planned route provided by the user, provides for display of task data that has been designated as a public task and having the geographic location data and the at least one route point planned route provided by the user data which pass the filter and for which the user has an account with a task management service, and does not provide task data designated as private by another user and in which the geographic location data and the at least one route point planned route provided by the user data in which the current geographic location is outside of the threshold distance; and a display device system in communication with the processor and configured to display in a map to the user task data describing the one or more user generated tasks provided from the task management application for display.

15. The mobile computing device of claim 14, wherein the mobile computing device is a smart phone and the network-based service is a web based calendar service.

16. The mobile computing device of claim 14, wherein the geographic locator module determines the mobile computing device's current geographical location coordinates from Global Positioning System signals received by the mobile computing device.

* * * * *